(12) United States Patent
Robertson

(10) Patent No.: US 11,001,322 B2
(45) Date of Patent: *May 11, 2021

(54) REAL-TIME RETRACTABLE TRAINING WHEELS SYSTEM AND METHOD

(71) Applicant: Peyton Webb Robertson, Fort Lauderdale, FL (US)

(72) Inventor: Peyton Webb Robertson, Fort Lauderdale, FL (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/961,058

(22) Filed: Apr. 24, 2018

(65) Prior Publication Data

US 2018/0237090 A1 Aug. 23, 2018

Related U.S. Application Data

(63) Continuation of application No. 15/277,641, filed on Sep. 27, 2016, now Pat. No. 9,975,592, which is a
(Continued)

(51) Int. Cl.
*B62H 1/12* (2006.01)
*F16C 1/12* (2006.01)
(Continued)

(52) U.S. Cl.
CPC ............... *B62H 1/12* (2013.01); *B62H 1/02* (2013.01); *F16C 1/12* (2013.01); *G09B 19/16* (2013.01)

(58) Field of Classification Search
CPC .... B62H 1/02; B62H 1/12; B62H 7/00; F16C 1/12; G09B 19/16; G09B 19/167
See application file for complete search history.

(56) References Cited

U.S. PATENT DOCUMENTS 502,298 A 8/1893 Hyarns
1,154,089 A * 9/1915 Bryant ............... B62K 3/002
280/296
(Continued)

FOREIGN PATENT DOCUMENTS

CN 1069238 A 2/1992
CN 1745014 A 3/2006
(Continued)

OTHER PUBLICATIONS

Non-Final Office Action; U.S. Appl. No. 14/315,623; dated Aug. 20, 2014.
(Continued)

*Primary Examiner* — Anne Marie M Boehler
(74) *Attorney, Agent, or Firm* — Michael T. Abramson; Holland & Knight LLP

(57) ABSTRACT

A training wheel apparatus for learning to ride a bicycle includes a lift activation assembly, wherein the lift activation assembly includes a grip. The training wheel apparatus further includes a wheel mount assembly configured to operatively connect to a wheel. The training wheel apparatus further includes a cable configured to operatively connect to the lift activation assembly and the wheel mount assembly via the grip. When activated by rotation of the grip in a first direction, the lift activation assembly is configured to use the cable to change an elevation of the wheel between a first position.

21 Claims, 12 Drawing Sheets

Related U.S. Application Data continuation of application No. 15/012,543, filed on Feb. 1, 2016, now Pat. No. 9,475,533, which is a continuation of application No. 14/754,981, filed on Jun. 30, 2015, now Pat. No. 9,284,002, which is a continuation-in-part of application No. 14/580,538, filed on Dec. 23, 2014, now Pat. No. 9,096,285, which is a continuation of application No. 14/315,623, filed on Jun. 26, 2014, now Pat. No. 8,944,453.

(60) Provisional application No. 61/894,596, filed on Oct. 23, 2013.

(51) Int. Cl.
*B62H 1/02* (2006.01)
*G09B 19/16* (2006.01)

(56) References Cited

U.S. PATENT DOCUMENTS

| | | | |
|---|---|---|---|
| 1,233,300 A * | 7/1917 | Bancalari | B62H 7/00 |
| | | | 280/304 |
| 2,633,934 A * | 4/1953 | Champoux | B62L 1/00 |
| | | | 188/5 |
| 2,960,351 A | 11/1960 | Jeffress | |
| 3,877,727 A | 4/1975 | Johannsen | |
| 4,002,350 A | 1/1977 | Timbs | |
| 4,181,190 A | 1/1980 | Yang | |
| 4,367,883 A * | 1/1983 | Anderson | B62J 27/00 |
| | | | 280/301 |
| 4,526,056 A | 7/1985 | Yamanaka | |
| 4,541,650 A * | 9/1985 | Cline | B62H 1/06 |
| | | | 182/200 |
| 4,615,535 A | 10/1986 | McMurtrey | |
| 4,691,798 A | 9/1987 | Engelbach | |
| 4,810,000 A | 3/1989 | Saunders | |
| 4,895,224 A | 1/1990 | Sugihara | |
| 4,917,398 A | 4/1990 | de Miranda Pinto | |
| 4,966,047 A | 10/1990 | Krauer et al. | |
| 5,005,674 A | 4/1991 | Piatt | |
| 5,029,894 A | 7/1991 | Willman | |
| 5,064,213 A | 11/1991 | Storch | |
| 5,100,163 A | 3/1992 | Egley et al. | |
| 5,154,096 A | 10/1992 | Geller et al. | |
| 5,154,575 A | 10/1992 | Bonner | |
| 5,419,575 A | 5/1995 | Shepherd | |
| 5,474,319 A | 12/1995 | Shepherd | |
| 5,492,354 A | 2/1996 | Rainey | |
| 5,904,218 A | 5/1999 | Watkins | |
| 5,927,441 A | 7/1999 | Luo | |
| 6,113,122 A | 9/2000 | Plana | |
| 6,170,846 B1 * | 1/2001 | Holter | B62H 1/02 |
| | | | 280/293 |
| 6,213,237 B1 | 4/2001 | Willman | |
| 6,286,849 B1 | 9/2001 | Slattery | |
| 6,296,266 B1 | 10/2001 | Martin | |
| 6,318,745 B1 | 11/2001 | Sharp, III | |
| 6,685,208 B1 | 2/2004 | Cowie | |
| 7,032,916 B2 | 4/2006 | Plana | |
| 7,314,225 B2 | 1/2008 | Murnen et al. | |
| 7,540,519 B1 | 2/2009 | Coyle | |
| 7,556,277 B2 | 7/2009 | Lytle | |
| 7,641,213 B1 | 1/2010 | Chen | |
| 8,006,994 B2 * | 8/2011 | Chen | B62H 1/12 |
| | | | 280/293 |
| 8,944,453 B1 | 2/2015 | Robertson | |
| 9,096,285 B2 | 8/2015 | Robertson | |
| 9,266,574 B1 * | 2/2016 | Lippman | B62H 1/06 |
| 9,284,002 B2 | 3/2016 | Robertson | |
| 9,975,592 B2 * | 5/2018 | Robertson | F16C 1/12 |
| 2002/0005619 A1 | 1/2002 | Cote | |
| 2005/0134019 A1 | 6/2005 | Plana | |
| 2005/0167961 A1 | 8/2005 | Murata et al. | |
| 2006/0244249 A1 | 11/2006 | Goertzen et al. | |
| 2008/0029994 A1 | 2/2008 | Lytle | |
| 2008/0164676 A1 | 7/2008 | Bell | |
| 2015/0298751 A1 | 10/2015 | Robertson | |

FOREIGN PATENT DOCUMENTS

| | | |
|---|---|---|
| CN | 201834096 U | 5/2011 |
| DE | 53209 | 12/1889 |
| DE | 93077 | 7/1896 |
| JP | 2013203289 A | 10/2013 |
| NL | 15374 | 2/1927 |

OTHER PUBLICATIONS

Final Office Action; U.S. Appl. No. 14/315,623; dated Sep. 30, 2014.

International Search Report; PCT Application Serial No. PCT/US2014/044291; dated Nov. 5, 2014.

Non-Final Office Action; U.S. Appl. No. 14/560,538; dated Feb. 23, 2015.

Non-Final Office Action; U.S. Appl. No. 14/754,981; dated Aug. 4, 2015.

International Search Report; PCT Application Serial No. PCT/US2015/038577; dated Sep. 29, 2015.

Non-Final Office Action; U.S. Appl. No. 15/012,543; dated Mar. 22, 2016.

Non-Final Office Action; U.S. Appl. No. 15/277,641; dated Nov. 18, 2016.

Final Office Action; U.S. Appl. No. 15/277,641; dated May. 17, 2017.

Non-Final Office Action; U.S. Appl. No. 15/277,641; dated Jan. 24, 2018.

Communication pursuant to Rule 70(2) and 70a(2) EPC together with Supplementary European Search Report in Application Serial No. 14855435.5 dated Jul. 18, 2017.

Notification of First Office Action; Chinese Appiication Seriai No. 2015860705696; dated Feb. 12, 2019.

* cited by examiner

REAL-TIME RETRACTABLE TRAINING WHEELS SYSTEM AND METHOD

RELATED CASES

This application is a continuation of U.S. application Ser. No. 15/277,641, filed on Sep. 27, 2016, entitled "Real-Time Retractable Training Wheels System and Method", which is a continuation of U.S. application Ser. No. 15/012,543, filed on Feb. 1, 2016, entitled "Real-Time Retractable Training Wheels System and Method", which is a continuation of U.S. application Ser. No. 14/754,981, filed on Jun. 30, 2015, entitled "Real-Time Retractable Training Wheels System and Method", which is a Continuation-In-Part of U.S. application Ser. No. 14/580,538, filed on Dec. 23, 2014, entitled "Real-Time Retractable Training Wheels System and Method", which is a continuation of U.S. application Ser. No. 14/315,623, filed on Jun. 26, 2014, entitled "Real-Time Retractable Training Wheels System and Method", now issued as U.S. Pat. No. 8,944,453, which claims the benefit of U.S. Provisional Application No. 61/894,596, filed on 23 Oct. 2013, by Peyton Webb Robertson, entitled "Real-Time Retractable Training Wheels System and Method", the contents of which are all herein incorporated by reference.

BACKGROUND

When a child (or adult) learns to ride a bicycle, training wheels may sometimes be used. Training wheels typically attach to both sides of the bicycle, thus providing greater stability than if the training wheels were not attached. While the training wheels are attached, the rider may not necessarily be provided with the desired feel of balancing their own body weight on two wheels. Thus, over time, the goal is to remove the training wheels so that the rider may balance the bicycle on its own two wheels. Parents may sometimes remove the training wheels, but provide the additional stability by holding onto the bicycle while the rider learns to balance their body weight on two wheels. However, eventually the parent must let go of the bicycle to allow the rider to truly learn to balance their body weight on two wheels. Sometimes, the rider is not yet ready for this stage, and risks falling and injury.

BRIEF SUMMARY OF DISCLOSURE

In one implementation, a training wheel apparatus may include but is not limited to a lift activation assembly, wherein the lift activation assembly may include a grip. The training wheel apparatus may further include a wheel mount assembly that may be configured to operatively connect to a wheel. The training wheel apparatus may further include a cable that may be configured to operatively connect to the lift activation assembly and the wheel mount assembly via the grip. When activated by rotation of the grip in a first direction, the lift activation assembly may be configured to use the cable to change an elevation of the wheel between a first position and a second position while the wheel is in motion.

One or more of the following features may be included. A release switch may be included that, when activated, may change the elevation of the wheel to the first position. The grip, when rotated in a second direction, may change the elevation of the wheel to the first position. The lift activation assembly may further include a drive gear, a clutch gear, and a drive latch, wherein the drive latch, when the grip is rotated in the first position, may pivot in a mount on the clutch gear and engages teeth on the drive gear. A switch may be included, wherein the switch, when toggled, may activate the lift activation assembly. A cable gear may be included, wherein the cable, when the grip is rotated in the first position, winds around a recessed area on the cable gear. The lift activation assembly may further include a base latch operatively connected to the clutch gear, that when engaged with a notch on a base plate, may prevent the grip from rotation in the second direction. The drive latch, when a release switch is activated, may disengage the clutch gear from the drive gear by rotating out of its engagement with one or more teeth of the drive gear. The change in elevation of the wheel between the first position and the second position may include a plurality of predetermined set elevations, wherein each elevation of the plurality of predetermined set elevations may be based upon, at least in part, a degree of activation of the lift activation assembly. The wheel mount assembly may be further configured to operatively connect to a bicycle frame. The wheel may include a training wheel.

In another implementation, a training wheel apparatus may include but is not limited to a lift activation assembly that may be configured to operatively connect to a handlebar of a bicycle frame, wherein the lift activation assembly may include a grip. The training wheel apparatus may further include a wheel mount assembly that may be configured to operatively connect to a wheel and may be further configured to operatively connect to the bicycle frame. The training wheel apparatus may further include a cable that may be configured to operatively connect to the lift activation assembly and the wheel mount assembly via the grip. When activated by rotation of the grip in a first direction, the lift activation assembly may be configured to use the cable to change an elevation of the wheel between a first position and a second position while the wheel is in motion.

One or more of the following features may be included. A release switch may be included that, when activated, may change the elevation of the wheel to the first position. The grip, when rotated in a second direction, may change the elevation of the wheel to the first position. The lift activation assembly may further include a drive gear, a clutch gear, and a drive latch, wherein the drive latch, when the grip is rotated in the first position, may pivot in a mount on the clutch gear and engages teeth on the drive gear. A switch may be included, wherein the switch, when toggled, may activate the lift activation assembly. A cable gear may be included, wherein the cable, when the grip is rotated in the first position, winds around a recessed area on the cable gear. The lift activation assembly may further include a base latch operatively connected to the clutch gear, that when engaged with a notch on a base plate, may prevent the grip from rotation in the second direction. The drive latch, when a release switch is activated, may disengage the clutch gear from the drive gear by rotating out of its engagement with one or more teeth of the drive gear. The change in elevation of the wheel between the first position and the second position may include a plurality of predetermined set elevations, wherein each elevation of the plurality of predetermined set elevations may be based upon, at least in part, a degree of activation of the lift activation assembly. The change of the elevation of the wheel may be configured to occur while the wheel is in motion. The wheel may include a training wheel.

In another implementation, a training wheel apparatus may include but is not limited to a lift activation assembly that may be configured to operatively connect to a handlebar of a bicycle frame, wherein the lift activation assembly may include a switch, wherein the lift activation assembly may further include a cable gear. The training wheel apparatus may further include a wheel mount assembly that may be configured to operatively connect to a wheel and may be further configured to operatively connect to the bicycle frame. The training wheel apparatus may further include a cable that may be configured to operatively connect to the lift activation assembly and the wheel mount assembly. When activated by the switch, the lift activation assembly may be configured to use the cable to change an elevation of the wheel between a first position and a second position, by winding around a recessed area on the cable gear.

One or more of the following features may be included. A release switch may be included that, when activated, may change the elevation of the wheel to the first position. The grip, when rotated in a second direction, may change the elevation of the wheel to the first position. The lift activation assembly may further include a drive gear, a clutch gear, and a drive latch, wherein the drive latch, when the grip is rotated in the first position, may pivot in a mount on the clutch gear and engages teeth on the drive gear. The lift activation assembly may further include a base latch operatively connected to the clutch gear, that when engaged with a notch on a base plate, may prevent the grip from rotation in the second direction. The drive latch, when a release switch is activated, may disengage the clutch gear from the drive gear by rotating out of its engagement with one or more teeth of the drive gear. The change in elevation of the wheel between the first position and the second position may include a plurality of predetermined set elevations, wherein each elevation of the plurality of predetermined set elevations may be based upon, at least in part, a degree of activation of the lift activation assembly. The change of the elevation of the wheel may be configured to occur while the wheel is in motion. The wheel may include a training wheel.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
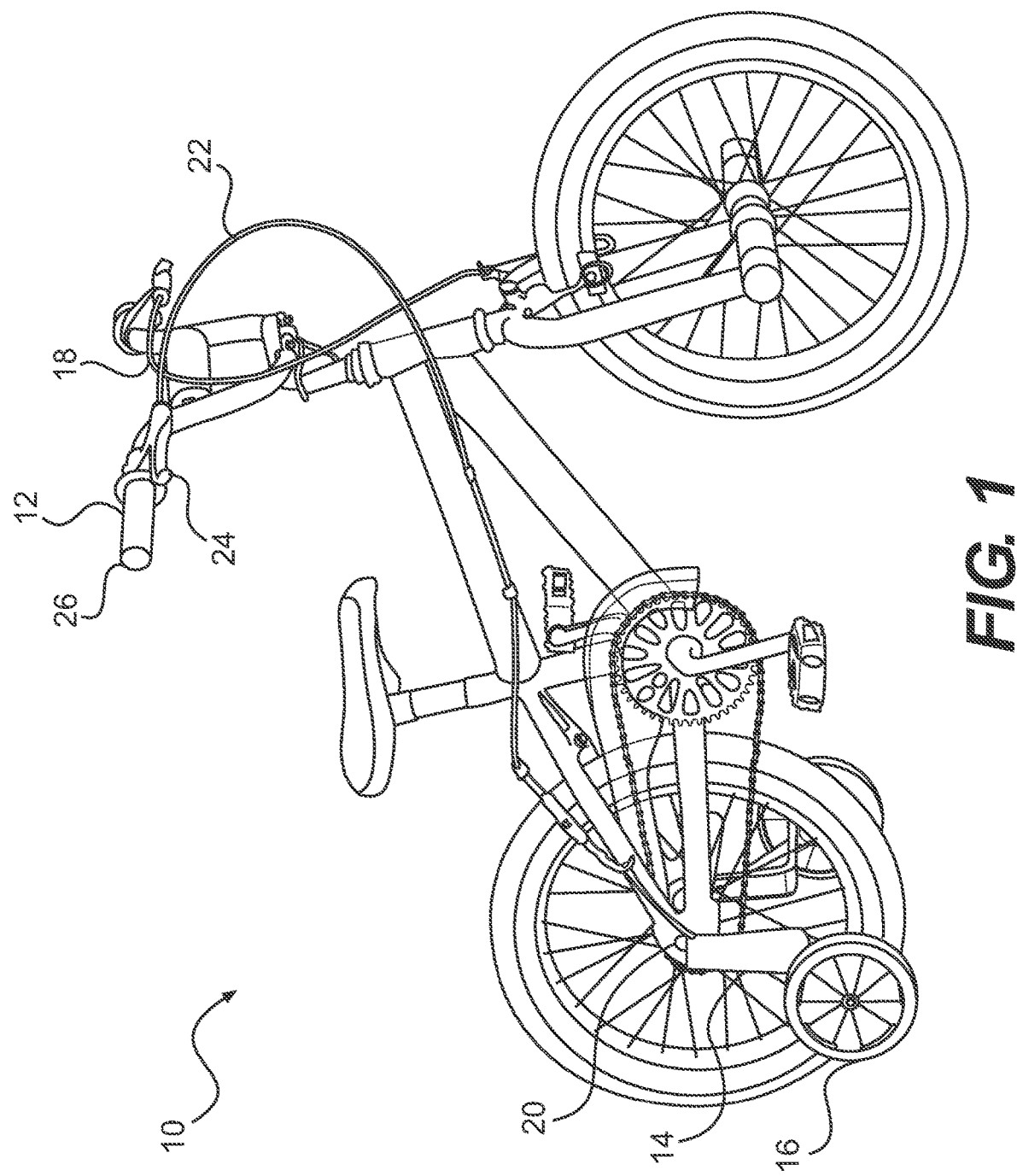
FIG. 1 is an illustrative perspective view of a bicycle with a training wheel assembly according to one or more implementations of the present disclosure.

When a child (or adult) learns to ride a bicycle, training wheels may sometimes be used. Training wheels typically attach to both sides of the bicycle, thus providing greater stability than if the training wheels were not attached. While the training wheels are attached, the rider may not necessarily be provided with the desired feel of balancing their own body weight on two wheels. Thus, over time, the goal is to remove the training wheels so that the rider may balance the bicycle on its own two wheels. Parents may sometimes remove the training wheels, but provide the additional stability by holding onto the bicycle while the rider learns to balance their body weight on two wheels. However, eventually the parent must let go of the bicycle to allow the rider to truly learn to balance their body weight on two wheels. Sometimes, the rider is not yet ready for this stage, and risks falling and injury.

Beginner riders may want to enjoy the thrill of trying to balance their own body weight while riding, but simultaneously avoid injuries that may occur when they lose their balance and fall. Additionally, the rider may want to practice their riding skills without the training wheels, even when the parent is not available to provide the added stability.

In general, consistent with the present disclosure, a real-time retractable training wheel assembly may allow novice cyclists to experience the real feel of balancing on two wheels of a bicycle without training wheels, while at the same time giving them a back-up plan if they begin to fall. Generally, when the rider activates the lift activation assembly, the training wheels attached to a wheel mount assembly may lift off the ground, transforming a bicycle with engaged training wheels into a bicycle without engaged training wheels in real-time (e.g., while the bicycle is in motion). When the rider may deactivate the lift activation assembly, the training wheels attached to the wheel mount assembly may return to the ground, transforming a bicycle without engaged training wheels into a bicycle with engaged training wheels in real-time (e.g., while the bicycle is in motion).

As will be discussed below in greater detail, a training wheel apparatus may include but is not limited to a lift activation assembly. The training wheel apparatus may further include a wheel mount assembly that may be configured to operatively connect to a wheel. The training wheel apparatus may further include a cable that may be configured to operatively connect to the lift activation assembly and the wheel mount assembly. When activated, the lift activation assembly may be configured to use the cable to change an elevation of the wheel between a first position and a second position while the wheel is in motion. The lift activation assembly may include an actuator that may be configured to operatively connect to the cable. The actuator may include a handlebar grip, wherein the handlebar grip, when rotated, may activate the lift activation assembly. The actuator may include a lever, wherein the lever, when receiving pressure, may activate the lift activation assembly. The actuator may include a switch, wherein the switch, when toggled, may activate the lift activation assembly. The wheel mount assembly may include at least one ratchet bar that may be configured to operatively connect to the lift activation assembly via the cable, wherein the at least one ratchet bar may include at least one tooth. The wheel mount assembly may include at least one lock that may be configured to engage the at least one tooth of the at least one ratchet bar when the lift activation assembly is activated, wherein the at least one lock, when engaged, may be further configured to maintain the elevation of the wheel. The change in elevation of the wheel between the first position and the second position may include a plurality of predetermined set elevations, wherein each elevation of the plurality of predetermined set elevations may be based upon, at least in part, a degree of activation of the lift activation assembly. The wheel mount assembly may be further configured to operatively connect to a bicycle frame. The wheel may include a training wheel. The change of the elevation of the wheel may be configured to occur while the wheel is in motion.

As will also be discussed in greater detail, a training wheel apparatus may include but is not limited to a lift activation assembly, wherein the lift activation assembly may include a grip. The training wheel apparatus may further include a wheel mount assembly that may be configured to operatively connect to a wheel. The training wheel apparatus may further include a cable that may be configured to operatively connect to the lift activation assembly and the wheel mount assembly via the grip. When activated by rotation of the grip in a first direction, the lift activation assembly may be configured to use the cable to change an elevation of the wheel between a first position and a second position while the wheel is in motion. A release switch may be included that, when activated, may change the elevation of the wheel to the first position. The grip, when rotated in a second direction, may change the elevation of the wheel to the first position. The lift activation assembly may further include a drive gear, a clutch gear, and a drive latch, wherein the drive latch, when the grip is rotated in the first position, may pivot in a mount on the clutch gear and engages teeth on the drive gear. A switch may be included, wherein the switch, when toggled, may activate the lift activation assembly. A cable gear may be included, wherein the cable, when the grip is rotated in the first position, winds around a recessed area on the cable gear. The lift activation assembly may further include a base latch operatively connected to the clutch gear, that when engaged with a notch on a base plate, may prevent the grip from rotation in the second direction. The drive latch, when a release switch is activated, may disengage the clutch gear from the drive gear by rotating out of its engagement with one or more teeth of the drive gear. The change in elevation of the wheel between the first position and the second position may include a plurality of predetermined set elevations, wherein each elevation of the plurality of predetermined set elevations may be based upon, at least in part, a degree of activation of the lift activation assembly. The wheel mount assembly may be further configured to operatively connect to a bicycle frame. The wheel may include a training wheel.

As will be appreciated by one skilled in the art, the present disclosure may be embodied as a method or apparatus. Accordingly, the present disclosure may take the form of an entirely hardware/mechanical implementation or an implementation combining software and/or electrical hardware/mechanical aspects that may all generally be referred to herein as a "circuit," "module" or "assembly." Furthermore, the present disclosure may take the form of a computer program product on a computer-usable storage medium having computer-usable program code embodied in the medium.

Any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution apparatus or individual assemblies.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages. In some implementations, electronic circuitry including, for example, programmable logic circuitry, field-programmable gate arrays (FPGA), or programmable logic arrays (PLA) may execute the computer readable program instructions/code by utilizing state information of the computer readable program instructions to personalize the electronic circuitry, in order to perform aspects of the present disclosure.

The flowchart and block diagrams in the figures illustrate the architecture, functionality, and operation of possible implementations of apparatus and methods according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The Real-Time Training Wheel Apparatus:

As discussed above and referring also at least to FIGS. 1-12, training wheel apparatus 10 may include but is not limited to a lift activation assembly (e.g., lift activation assembly 12). For instance, as will be discussed in greater detail below, lift activation assembly 12 may be at least a portion of training wheel apparatus 10 that is used by the rider to initiate and control the real-time retraction of a bicycle's training wheels (e.g., while the bicycle is in motion). In some implementations, and referring at least to FIG. 1, lift activation assembly 12 may be configured to operatively connect to a handlebar of a bicycle frame (e.g., handlebar 18). This may be accomplished using any known coupling techniques suitable for the present disclosure, such as nuts, bolts or other fasteners, welding, etc. Due to such things as, e.g., ease of access by the rider, handlebar 18 may be the optimal placement for lift activation assembly 12. However, it will be appreciated that lift activation assembly 12 may be configured to operatively connect to any portion of the bicycle without departing from the scope of the disclosure. As such, any description of lift activation assembly 12 being operatively connected to any particular portion of the bicycle should be taken as an example only and not to limit the scope of the disclosure.

In some implementations, training wheel apparatus 10 may further include a wheel mount assembly (e.g., wheel mount assembly 14) that may be configured to operatively connect to a wheel. In some implementations, the wheel may include a training wheel (e.g., training wheel 16). Training wheel 16 may be operatively connected to wheel mount assembly 14 using any known techniques suitable for the present disclosure, such as those currently used to couple training wheels to a mount assembly (e.g., nuts, bolts or other fasteners, etc.).

In some implementations, and still referring at least to FIG. 1, wheel mount assembly 14 may be further configured to operatively connect to a bicycle frame (e.g., bicycle frame 20). This may be accomplished using any known coupling techniques suitable for the present disclosure, such as fasteners, welding, or those typically used to mount training wheels to bicycle frames. Due to such things as, e.g., balance and the ability to pedal, the portion of bicycle frame 20 that is parallel to the axel of the back tire may be the optimal placement for wheel mount assembly 14. However, it will be appreciated that wheel mount assembly 14 may be configured to operatively connect to any portion of bicycle frame 20 without departing from the scope of the disclosure. As such, any description of wheel mount assembly 14 being operatively connected to any particular portion of bicycle frame 20 or otherwise should be taken as an example only and not to limit the scope of the disclosure.

In some implementations, training wheel apparatus 10 may further include a cable (e.g., cable 22) that may be configured to operatively connect to lift activation assembly 12 and wheel mount assembly 14. For instance, in some implementations, cable 22 may operate and/or be connected to lift activation assembly 12 and/or wheel mount assembly 14 in a similar manner as cable bicycle brakes are operatively connected to brake levers and wheels respectively; however, other techniques may also be used without departing from the scope of the disclosure.

In some implementations, when activated, lift activation assembly 12 may be configured to use cable 22 to change an elevation of training wheel 16 between a first position and a second position while training wheel 16 is in motion. For example, as noted above and as will be discussed in greater detail below, with training wheels 16 on the ground (e.g., the first position), when the rider activates lift activation assembly 12, force may be placed on cable 22, whereby that force may result in lifting training wheel 16 off the ground (e.g., the second position) via wheel mount assembly 14, transforming in real-time (e.g., while the bicycle is in motion) the bicycle with engaged training wheels (e.g., grounded training wheels used to balance the rider) into a bicycle without engaged training wheels (e.g., elevated training wheels not used to balance the rider). It will be appreciated that the first and second positions may be reversed without departing from the scope of the disclosure. It will also be appreciated that the bicycle need not be moving for the present disclosure to function properly.

In some implementations, and continuing with the above example, lift activation assembly 12 may include an actuator that may be configured to operatively connect to cable 22. For example, in some implementations, the actuator may include a lever (e.g., lever 24), wherein lever 24, when receiving pressure, may activate lift activation assembly 12. For instance, the rider may apply pressure (e.g., force) to lever 24 by, e.g., squeezing lever 24 similarly to a bicycle brake lever. Once the rider applies enough force to lever 24, the force may be transferred to the attached cable 22, which may then be transferred to wheel mount assembly 14 to elevate training wheel 16 off the ground.

Figure 2:
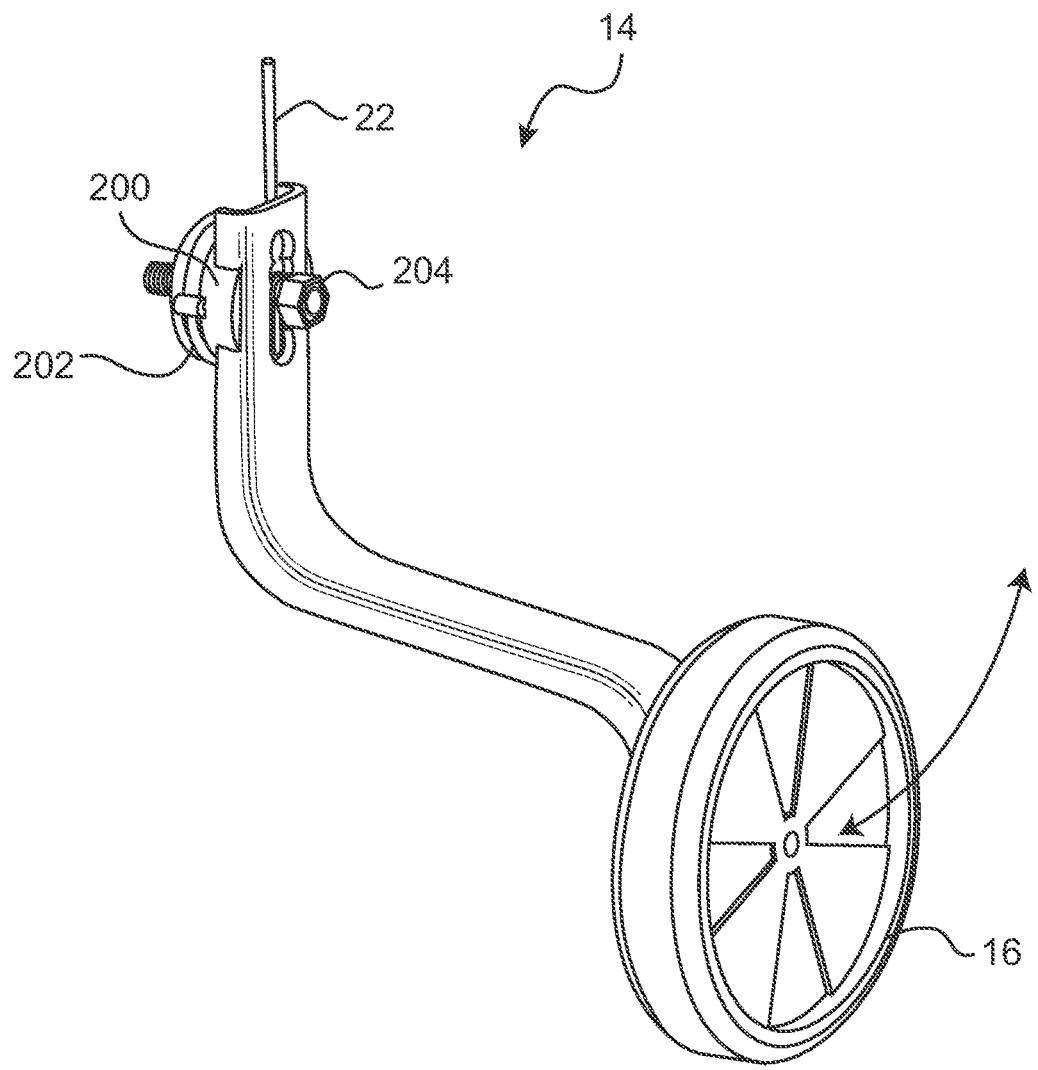
FIG. 2 is an illustrative perspective view of a wheel mount assembly of the training wheel assembly according to one or more implementations of the present disclosure.

In some implementations, and referring at least to FIG. 2, an example wheel mount assembly 14 is shown. The example wheel mount assembly 14 of FIG. 2 may include but is not limited to a lifting mechanism 200, cable system 202, cable 22, and spring 204. In the example, the rider may apply pressure (e.g., force) to lever 24 by, e.g., squeezing lever 24 similarly to a bicycle brake lever. Once the rider applies enough force to lever 24, the force may be transferred to the attached cable 22, which may then be transferred to wheel mount assembly 14 (e.g., via lifting mechanism 200) to elevate training wheel 16 off the ground (e.g., in a counter clockwise movement). In some implementations, wheel mount assembly 14 of FIG. 2 may include spring 204, such that the opposing tension of spring 204 caused by the movement of training wheel 16 enables the rider to deactivate lift activation assembly 12 by releasing lever 24. By releasing lever 24, the opposing tension of spring 204 may be used to return training wheel 16 to the ground. In some implementations, gravity may be sufficient to return training wheel 16 to the ground upon releasing lever 24.

Figure 3:
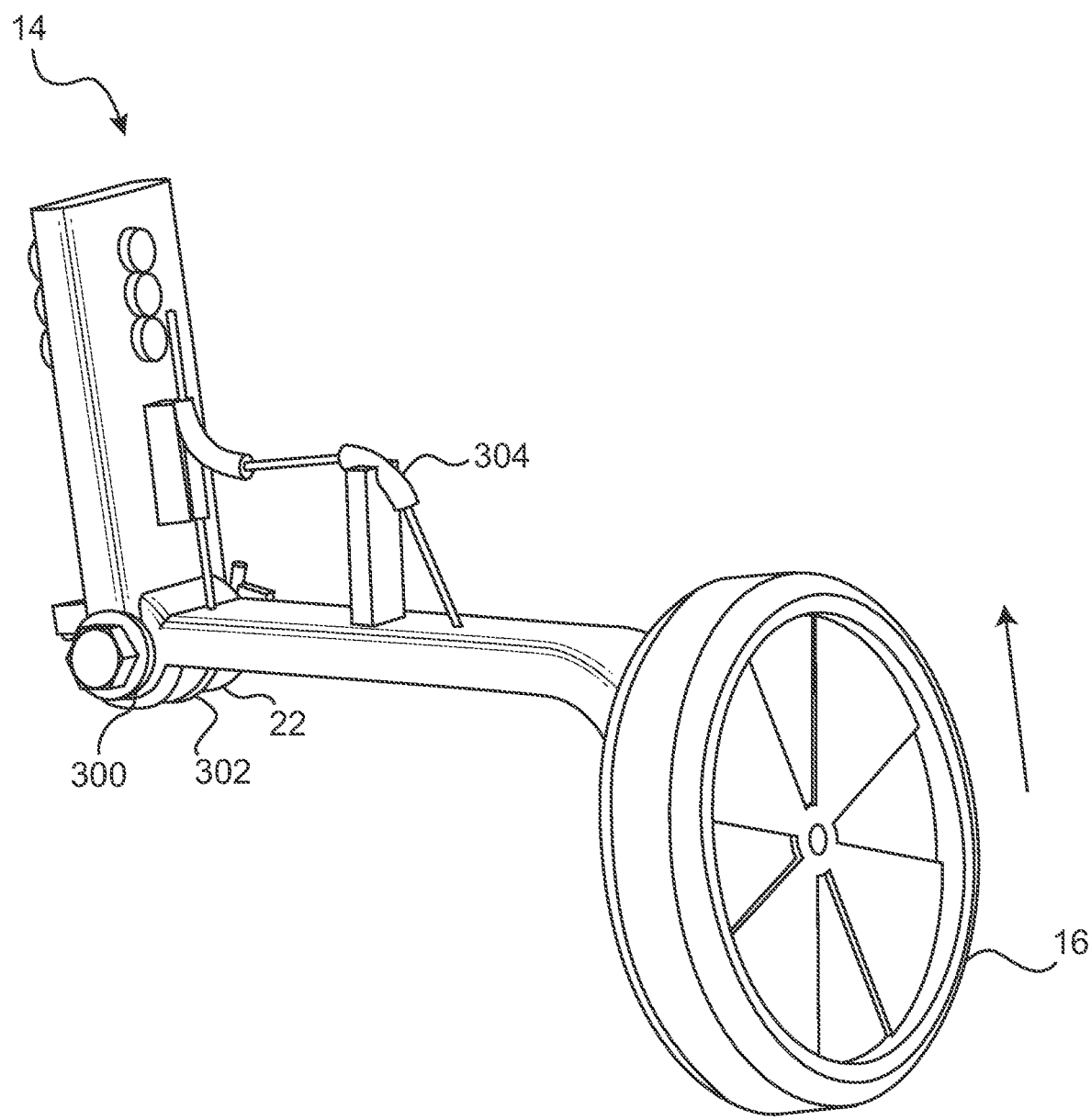
FIG. 3 is an illustrative perspective view of a wheel mount assembly of the training wheel assembly according to one or more implementations of the present disclosure.
Figure 4:
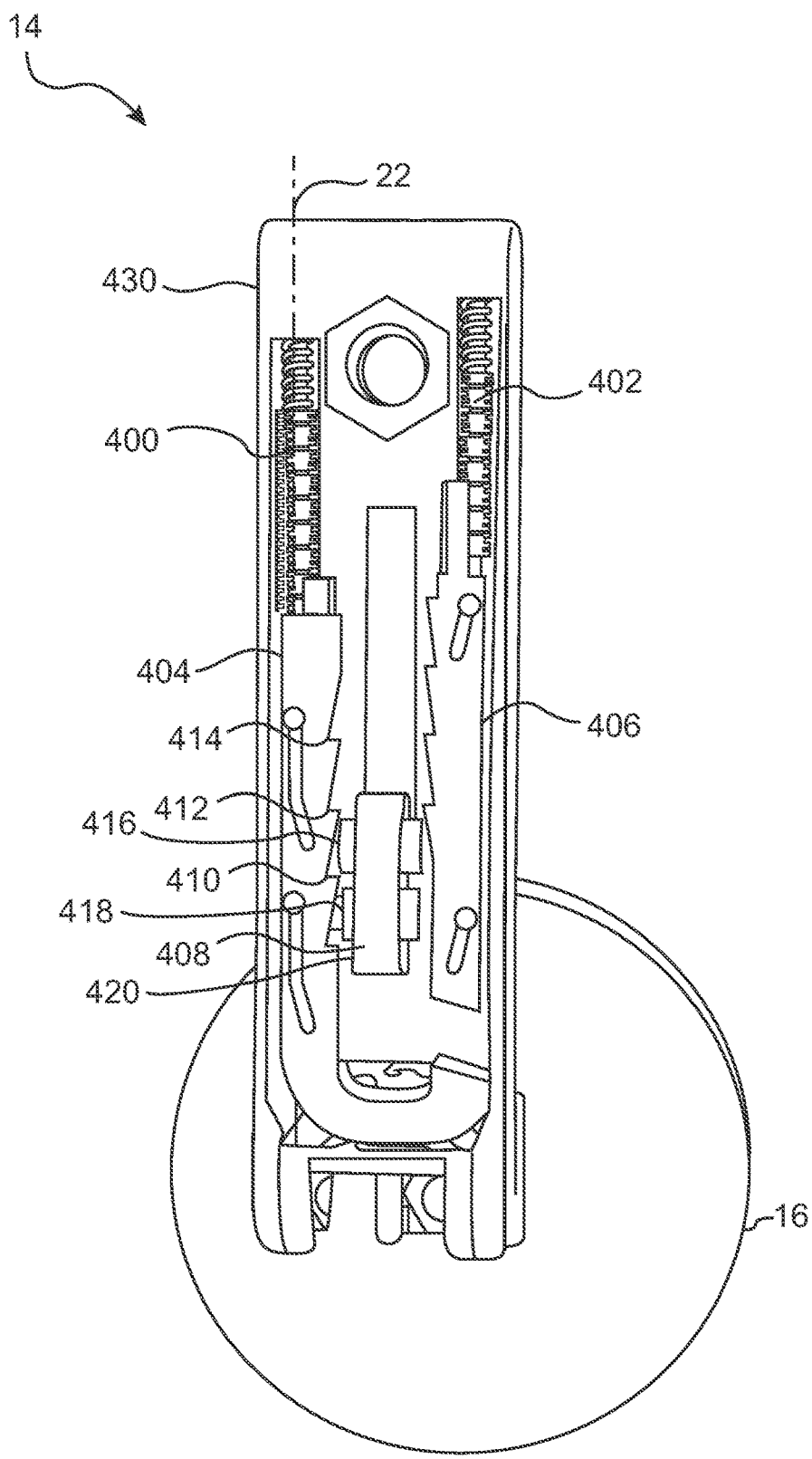
FIG. 4 is an illustrative rear perspective view of a wheel mount assembly of the training wheel assembly according to one or more implementations of the present disclosure.
Figure 5:
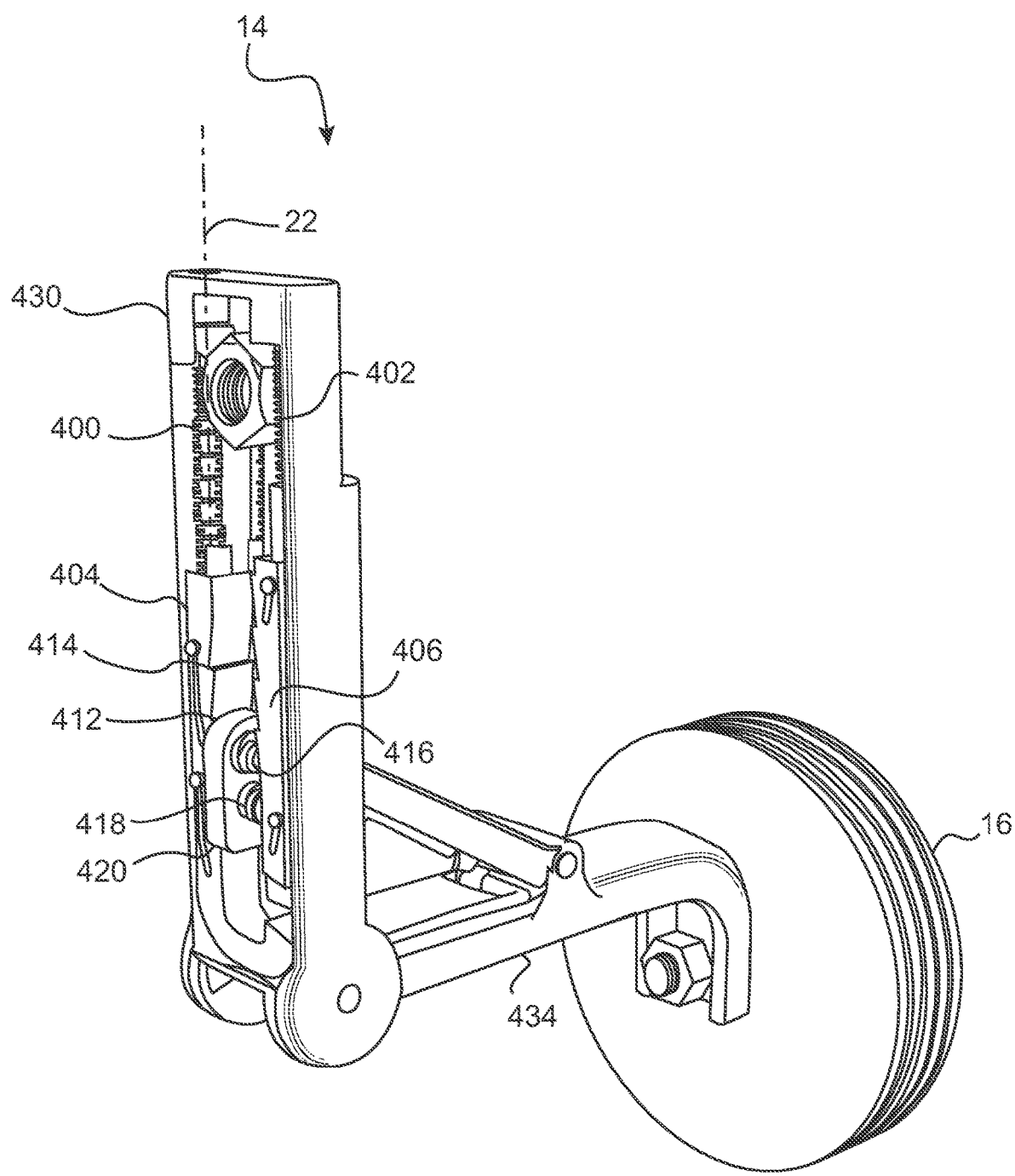
FIG. 5 is an illustrative rear perspective view of the wheel mount assembly of the training wheel assembly of FIG. 4 according to one or more implementations of the present disclosure.
Figure 6:
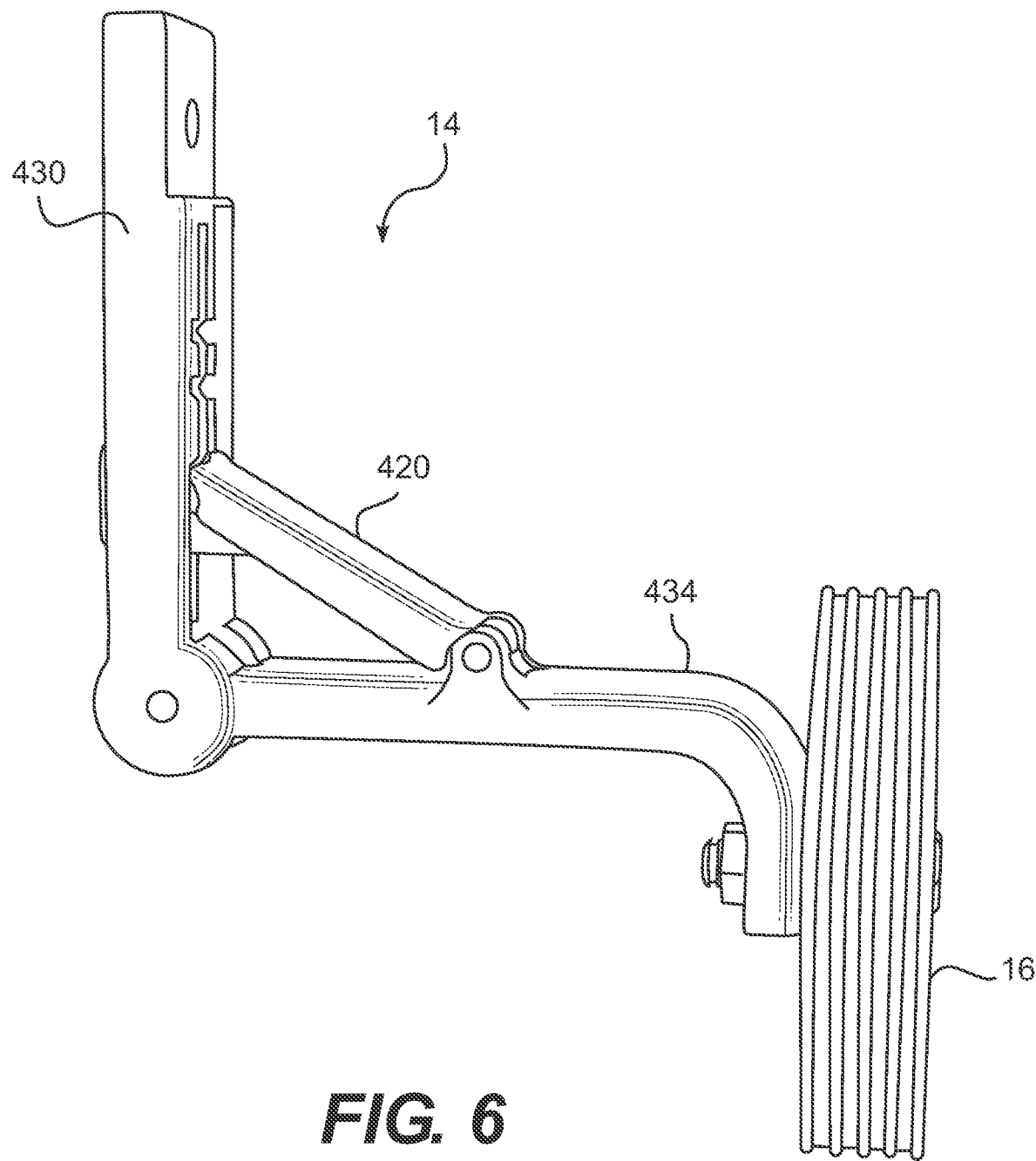
FIG. 6 is an illustrative side perspective view of the wheel mount assembly of the training wheel assembly of FIG. 4 according to one or more implementations of the present disclosure.
Figure 7:
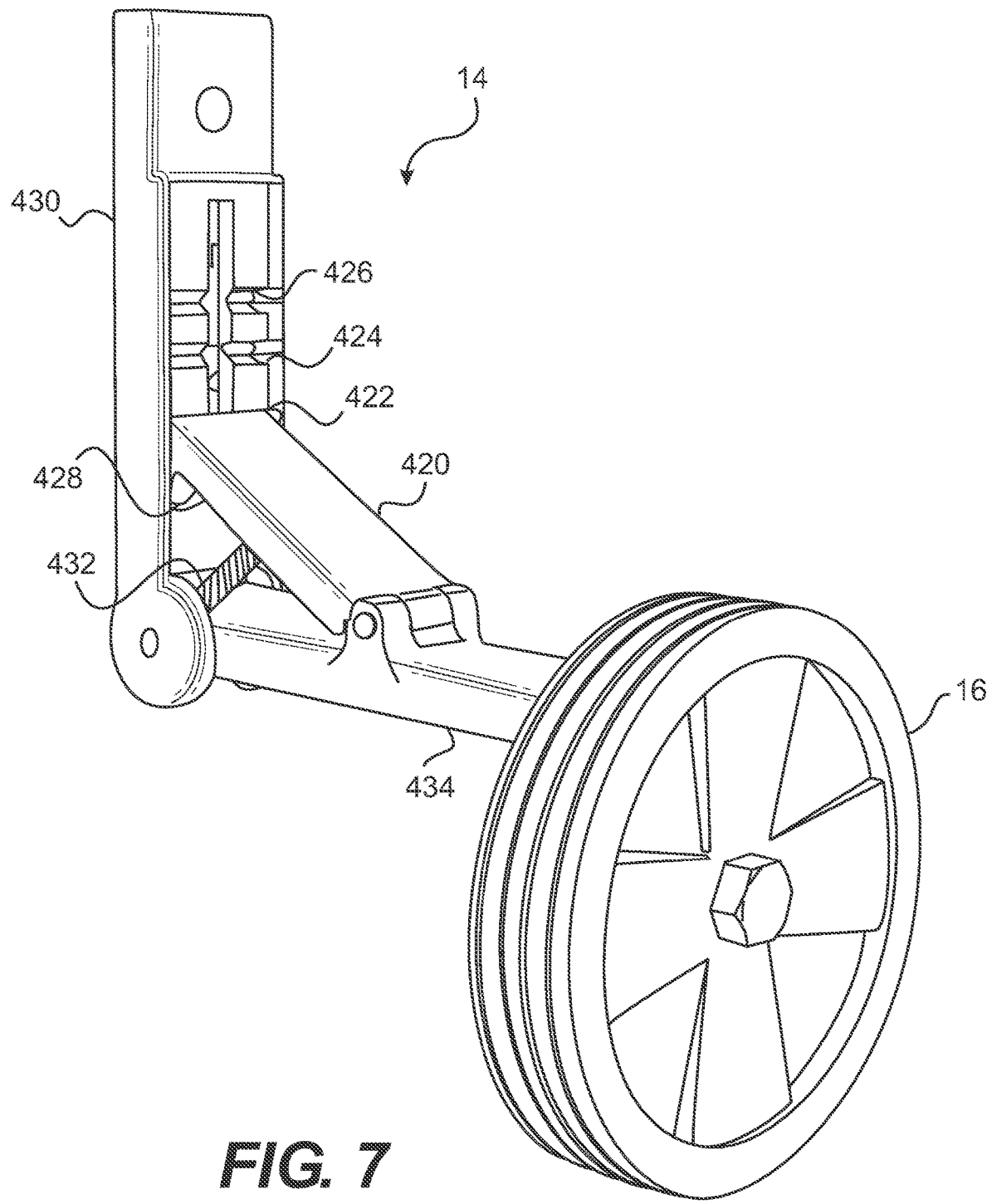
FIG. 7 is an illustrative side perspective view of the wheel mount assembly of the training wheel assembly of FIG. 4 according to one or more implementations of the present disclosure.

In some implementations, and referring at least to FIG. 3, an example wheel mount assembly 14 is shown. The example wheel mount assembly 14 of FIG. 3 may include but is not limited to a hinge 300, cable system 302, cable system 304, and cable 22. In the example, the rider may apply pressure (e.g., force) to lever 24 by, e.g., squeezing lever 24 similarly to a bicycle brake lever. Once the rider applies enough force to lever 24, the force may be transferred to the attached cable 22, which may then be transferred to wheel mount assembly 14 (e.g., via spring loaded hinge 300, cable system 302, cable system 304, or combination thereof) to elevate training wheel 16 off the ground (e.g., in a predominantly vertical movement). In some implementations, wheel mount assembly 14 of FIG. 3 may include a spring (e.g., an internal spring) in hinge 300, such that the opposing tension of the spring in hinge 300 caused by the movement of training wheel 16 enables the rider to deactivate lift activation assembly 12 by releasing lever 24. By releasing lever 24, the opposing tension of the spring in hinge 300 may be used to return training wheel 16 to the ground. In some implementations, gravity may be sufficient to return training wheel 16 to the ground upon releasing lever 24.

Figure 8:
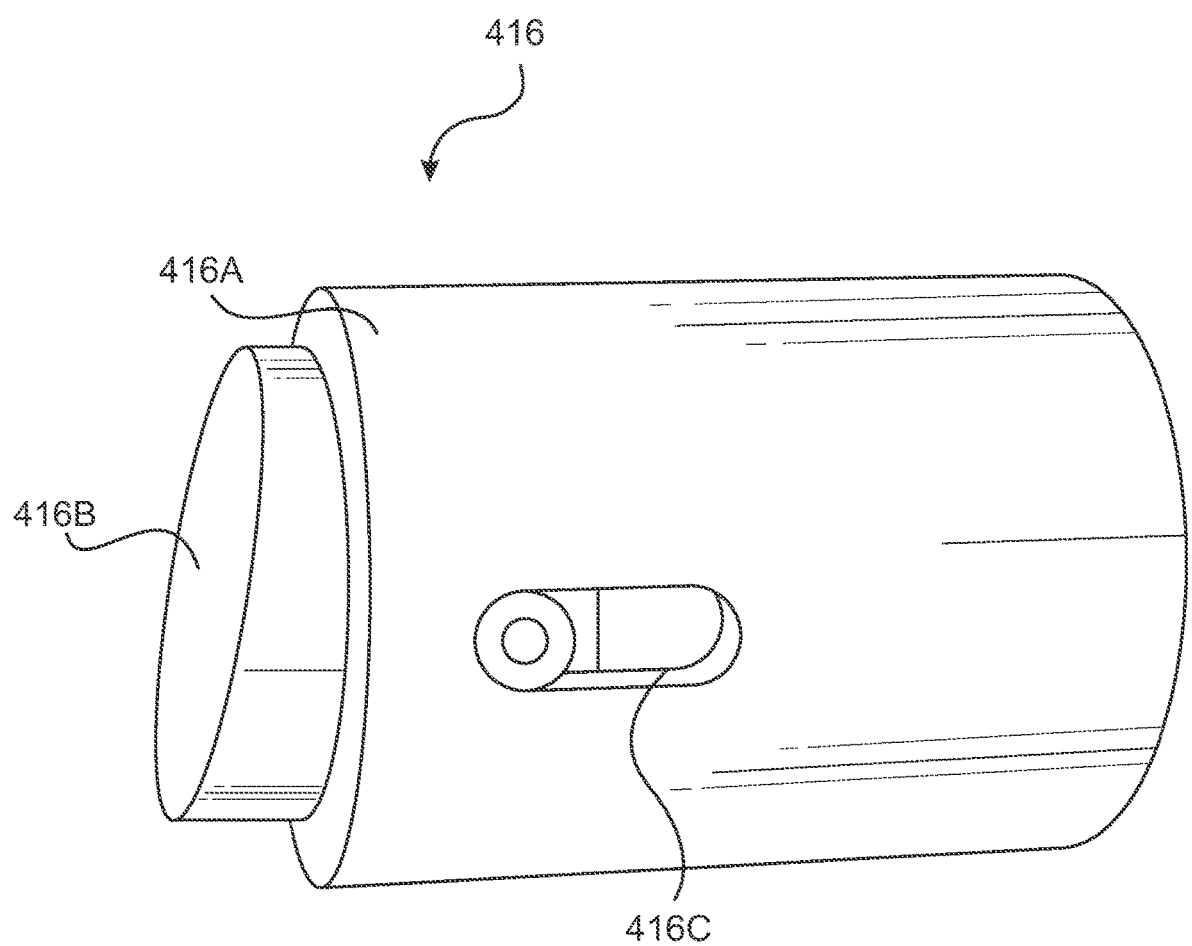
FIG. 8 is an illustrative perspective view of the wheel mount assembly of the training wheel assembly of FIG. 4 according to one or more implementations of the present disclosure.

In some implementations, the change in elevation of training wheel 16 between the first position and the second position may include a plurality of predetermined set elevations, wherein each elevation of the plurality of predetermined set elevations may be based upon, at least in part, a degree of activation of lift activation assembly 12. In some implementations, wheel mount assembly 14 may include at least one ratchet bar (e.g., ratchet bar 404/406) that may be configured to operatively connect to lift activation assembly 12 via cable 22, wherein ratchet bar 404/406 may include at least one tooth (e.g., tooth 408/410). In some implementations, wheel mount assembly 14 may include at least one lock (e.g., lock 416/418) that may be configured to engage tooth 408/410 of ratchet bar 404/406 when lift activation assembly 12 is activated, wherein lock 416/418, when engaged, may be further configured to maintain the elevation of training wheel 16. For instance, and referring at least to FIGS. 4-8, an example wheel mount assembly 14 is shown. The example wheel mount assembly 14 of FIGS. 4-8 may include but is not limited to cable 22, at least one return spring (e.g., return spring 400 and return spring 402), at least one ratchet bar (e.g., ratchet bar 404 and ratchet bar 406), one or more ratchet bar teeth (e.g., teeth 408, 410, 412, 414), at least one spring lock (e.g., upper spring lock 416 and lower spring lock 418), a support arm (e.g., support arm 420), at least one locking notch (e.g., locking notch 422, 424, 426, 428), a housing arm (e.g., housing arm 430), a return spring (e.g., return spring 432), a wheel mount arm (e.g., wheel mount arm 434), and training wheel 16. Referring at least to FIG. 8, an example spring lock (e.g., upper spring lock 416) is shown. Upper spring lock 416 may include, e.g., a housing (e.g., housing 416A), a tooth (e.g., tooth 416B), and a spring (e.g., spring 416C). As will be discussed below, the above-noted spring locks may include assemblies that engage the above-noted ratchet bar teeth, which may allow support arm 420 to be raised/lowered and held in position until released.

As noted above, the change in elevation of training wheel 16 between the first position and the second position may include a plurality of predetermined set elevations, wherein each elevation of the plurality of predetermined set elevations may be based upon, at least in part, a degree of activation of lift activation assembly 12. For instance, and referring again at least to FIG. 1, assume for example purposes only that the above-noted actuator may include a handlebar grip (e.g., handlebar grip 26), wherein handlebar grip 26, when rotated, may activate lift activation assembly 12. In some implementations, handlebar grip 26 may function similar to known "twist-style" gear control shifters. In some implementations, support arm 420, wheel mount arm 434, and training wheel 16 may be held in an elevated position by upper spring lock 416 engaging tooth 408 on ratchet bar 406 and lower spring lock 418 engaging tooth 410 on ratchet bar 404. In the example, training wheel 16 may be raised by rotating handlebar grip 26 in a first direction (e.g., counter clockwise) and around, e.g., 50% of its range (e.g., approximately 40 degrees). It will be appreciated that the number of predetermined set elevations may affect how much rotation is needed. As such, the amount of rotation (as well as the direction of rotation) should be taken as an example only and not to otherwise limit the scope of the disclosure.

The above-noted rotation may cause ratchet bar 404, which may be operatively connected to handlebar grip 26 via cable 22, to be raised some amount (e.g., approximately 0.5 inches). Tooth 408 on ratchet bar 404 may engage lower spring lock 418, which may be operatively connected to support arm 420. As such, support arm 420 may be raised some amount (e.g., approximately 0.5 inches), which in turn may raise wheel mount arm 434 and training wheel 16. In some implementations, upper spring lock 416 may additionally then engage the first tooth on ratchet bar 406 (e.g., via tooth 416B). In some implementations, each incremental turn of handlebar grip 26 may represent an individual predetermined set elevation. For instance, if there are only four predetermined set elevations (e.g., only four teeth per ratchet bar), handlebar grip 26 (via lift activation assembly 12) may be turned up to four times, with each turn raising (or lowering) wheel mount arm 434 and training wheel 16 depending on, e.g., the direction of the turn.

In some implementations, returning handlebar grip 26 to its starting position may return ratchet bar 404 to the first position (e.g., its resting position on the ground). In some implementations, training wheel 16 may (at any time) be lowered to the first position by, e.g., rotating handlebar grip 26 in a direction (e.g., counterclockwise) at, e.g., 100% of its range, which in the example may be, e.g., approximately 80 degrees. Such a rotation may cause both ratchet bars to be raised to their fullest extent (e.g., the second position). Ratchet bar 404 may move, e.g., 50% of its range in a first direction (e.g., parallel to housing arm 430). Ratchet bar 404 may then move the remaining 50% of its range in a second direction (e.g., diagonal motion), which may cause its teeth to lose engagement with lower spring lock 418. Ratchet bar 406 may move 100% of its range in a first direction (e.g., diagonal motion), which may cause its teeth to lose engagement with upper spring lock 416.

In some implementations, when the teeth on both ratchet bars lose engagement with the respective spring locks, return spring 432 may pull support arm 420 back to its starting position, which may lower wheel mount arm 434 and training wheel 16 to their starting positions. In some implementations, when wheel mount arm 434 and training wheel 16 are in the down position, support arm 420 may engage, e.g., locking notch 422, and mechanically lock training wheel 16 in the down position.

In some implementations, if the bicycle is not vertical when wheels 16 are lowered, the wheel closest to the ground may not lock in the down position, as support arm 420 may not be able to engage locking notch 422. Locking notches 424 and 426 may be considered safety notches. If the rider begins to fall one direction or the other, and training wheel 16 towards the direction of the fall is not locked in the down position, support arm 420 may engage one of the safety notches 424 and 426. When support arm 420 is engaged with at least one of the above-noted safety locking notches, support may be provided to the bicycle even though training wheel 16 may not be locked in the down position.

It will be appreciated that any type of gear control shifters (e.g., index shifters) as well as any type of known bicycle cable designs or otherwise may be modified into the above-noted lift activation assembly 12 to accomplish the present disclosure. As such, the use of any particular design or technique for implementing the objectives of the present disclosure should be taken as an example only and not to otherwise limit the scope of the disclosure.

Figure 9:
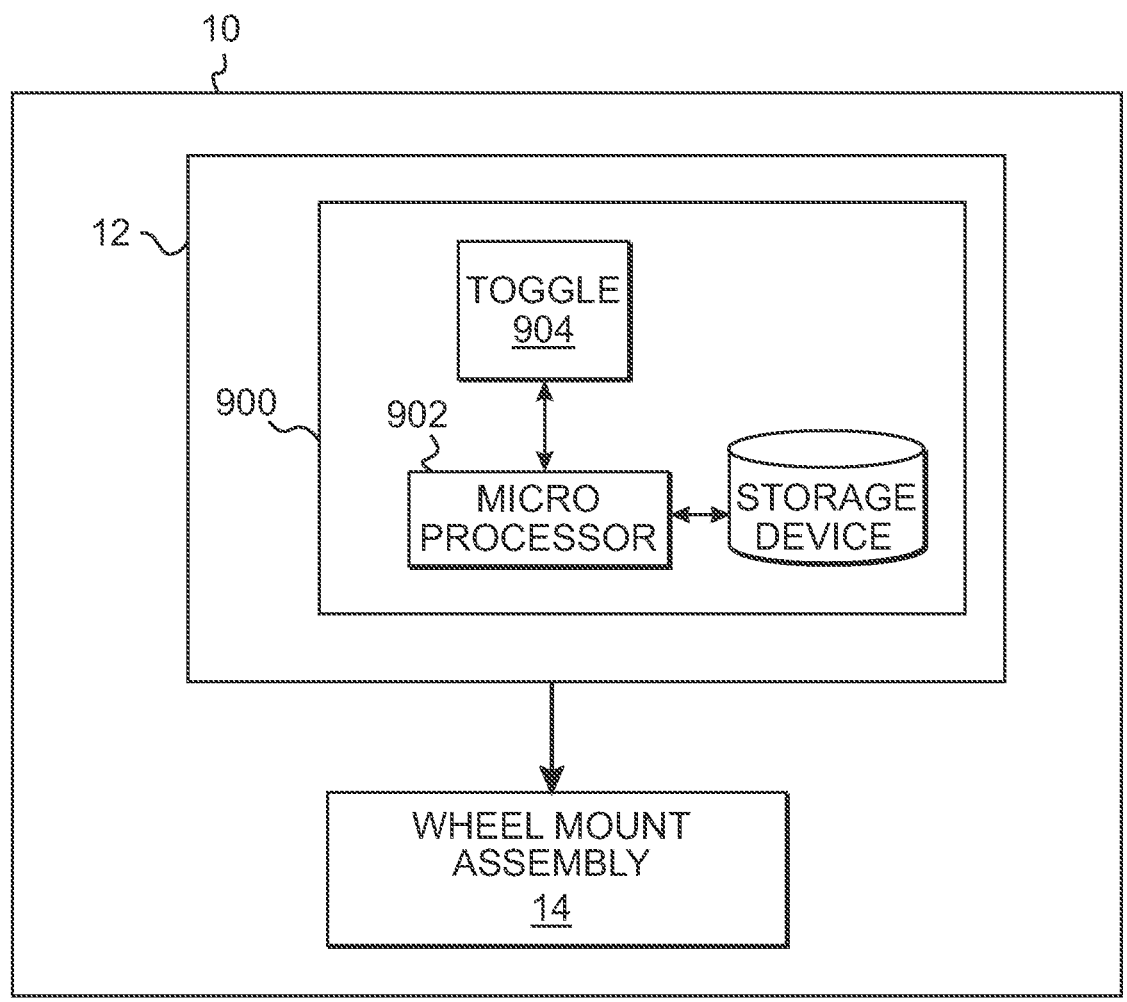
FIG. 9 is a diagrammatic view of the training wheel assembly according to one or more implementations of the present disclosure.
Figure 10:
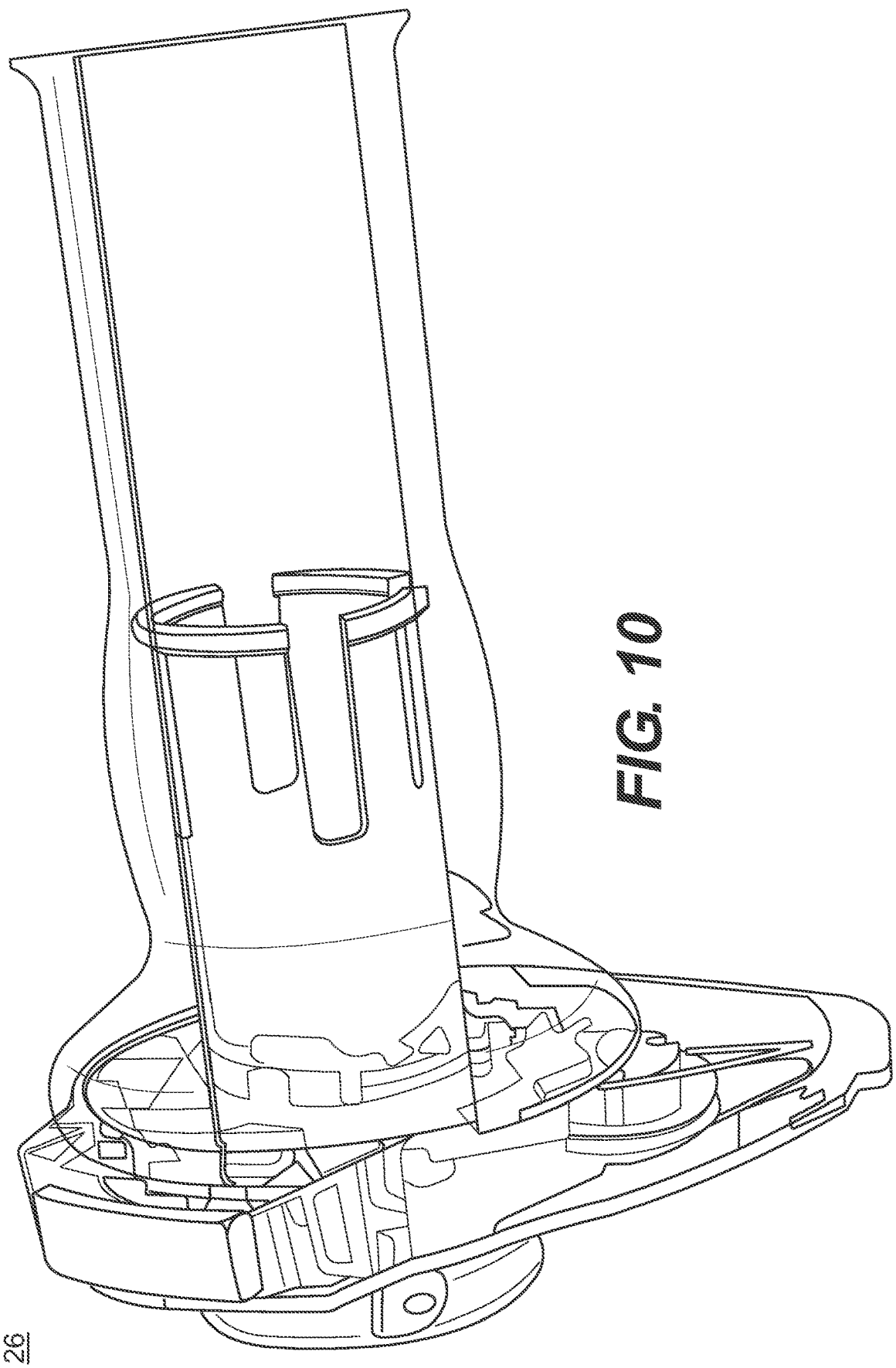
FIG. 10 is a diagrammatic view of the lift activation assembly according to one or more implementations of the present disclosure.

In some implementations, and referring at least to FIG. 9, the actuator may include a switch (e.g., switch 900), wherein switch 900, when toggled, may activate lift activation assembly 12. For example, in some implementations, an electronic switch (e.g., switch 900) may be used by the rider to elevate training wheel 16 off the ground similarly as discussed above. In some implementations, lift activation assembly 12 may include a processor and/or microprocessor (e.g., microprocessor 902) configured to, e.g., process data and execute the above-noted code/instruction sets and subroutines. For instance, microprocessor 902 may receive the signal from switch 900 to raise/lower training wheel 16. The signal may be received by the rider using an input (e.g., toggle 904). For instance, in some implementations, switch 900 may include an "Up" toggle setting and a "Down" toggle setting. For example, with training wheels 16 on the ground (e.g., the first position or "Down" setting), when the rider activates lift activation assembly 12 by toggling switch 900 to the appropriate setting (e.g., the second or "Up" setting), force may be placed on cable 22, whereby that force may result in lifting training wheel 16 off the ground (e.g., to the second position) via wheel mount assembly 14, transforming in real-time (e.g., while the bicycle is in motion) the bicycle with engaged training wheels (e.g., grounded training wheels used to balance the rider) into a bicycle without engaged training wheels (e.g., elevated training wheels not used to balance the rider).

In some implementations, switch 900 may include multiple height settings (e.g., for each of the above-noted predetermined set elevations). For instance, with training wheels 16 completely on the ground (e.g., the lowest toggle position), when the rider activates lift activation assembly 12 by toggling switch 900 to the appropriate setting (e.g., predetermined set elevation 2), force may be placed on cable 22, whereby that force may result in lifting training wheel 16 off the ground (e.g., to the second tooth per ratchet bar in the above example) via wheel mount assembly 14, transforming in real-time (e.g., while the bicycle is in motion) the bicycle with engaged training wheels (e.g., grounded training wheels used to balance the rider) into a bicycle without engaged training wheels (e.g., elevated training wheels not used to balance the rider).

It will be appreciated that any type of switch and/or switch configuration may be used without departing from the scope of the disclosure. Therefore, the description of the above-noted switch 900 should be taken as an example only and not to otherwise limit the scope of the disclosure.

While the present disclosure is described as being used with a bicycle, it will be appreciated that other balancing modes of transportation (or otherwise) may be used without departing from the scope of the disclosure. For example, training wheel assembly 10 may be used with, e.g., unicycles. As such, the use of a bicycle should be taken as an example only and not to otherwise limit the scope of the disclosure.

While the present disclosure is described as being activated by the rider (i.e., manually), it will be appreciated that training wheels 16 may be raised and lowered automatically. For instance, assume that, e.g., switch 900 includes a gyroscope, accelerometer, etc. The microprocessor may receive information from the, e.g., gyroscope, indicating that bicycle frame 20 is upright for a predetermined amount of time (e.g., 30 seconds). In response, microprocessor 902 may automatically activate switch 900 to raise training wheel 16. On the other hand, microprocessor 902 may receive information from the gyroscope indicating that bicycle frame 20 is moving at an angle (i.e., that the bicycle is falling). In response, microprocessor 902 may automatically deactivate switch 900 to lower training wheel 16 to the ground to provide balance to the rider before the bicycle completely falls and results in injury to the rider. As such, the description of a manual activation should be taken as an example only and not to otherwise limit the scope of the disclosure.

As noted above, and referring also at least to FIGS. 10-12, lift activation assembly 12 may include handlebar grip 26, that when rotated, may activate lift activation assembly 12. As will be discussed in greater detail below, the above-noted wheel mount assembly pivot arm may be unlocked and raised by turning the handlebar grip in a first direction (e.g., toward the front/back) of the bicycle with a hand (e.g., the right and/or left hand of the rider). As the handlebar grip is turned, the wheel may also be raised, as it may be attached to the pivot arm. The pivot arm may lock in the "up" position when the handlebar grip is rotated (e.g., one quarter of a turn).

If the rider loses his balance and begins to fall while the pivot arm is unlocked, the pivot arm on the side of the fall may be locked in whatever position it is in as soon as the wheel touches the ground. This may give the bicycle support and the rider a chance to recover his/her balance and continue riding or stop, straighten the bike, and try again.

When the pivot arm is locked in the "up" position, pushing a release switch (e.g., button) may enable it (and therefore the training wheel) to return to the ground and lock. In some implementations, even if the rider is holding the grip firmly in the raised position, the wheels may still be able to return to the ground. In the example, the rider need not twist the grip back to the starting position to reset it. In the example, the handlebar grip may reset itself automatically as soon as the wheels comes down.

Figure 11:
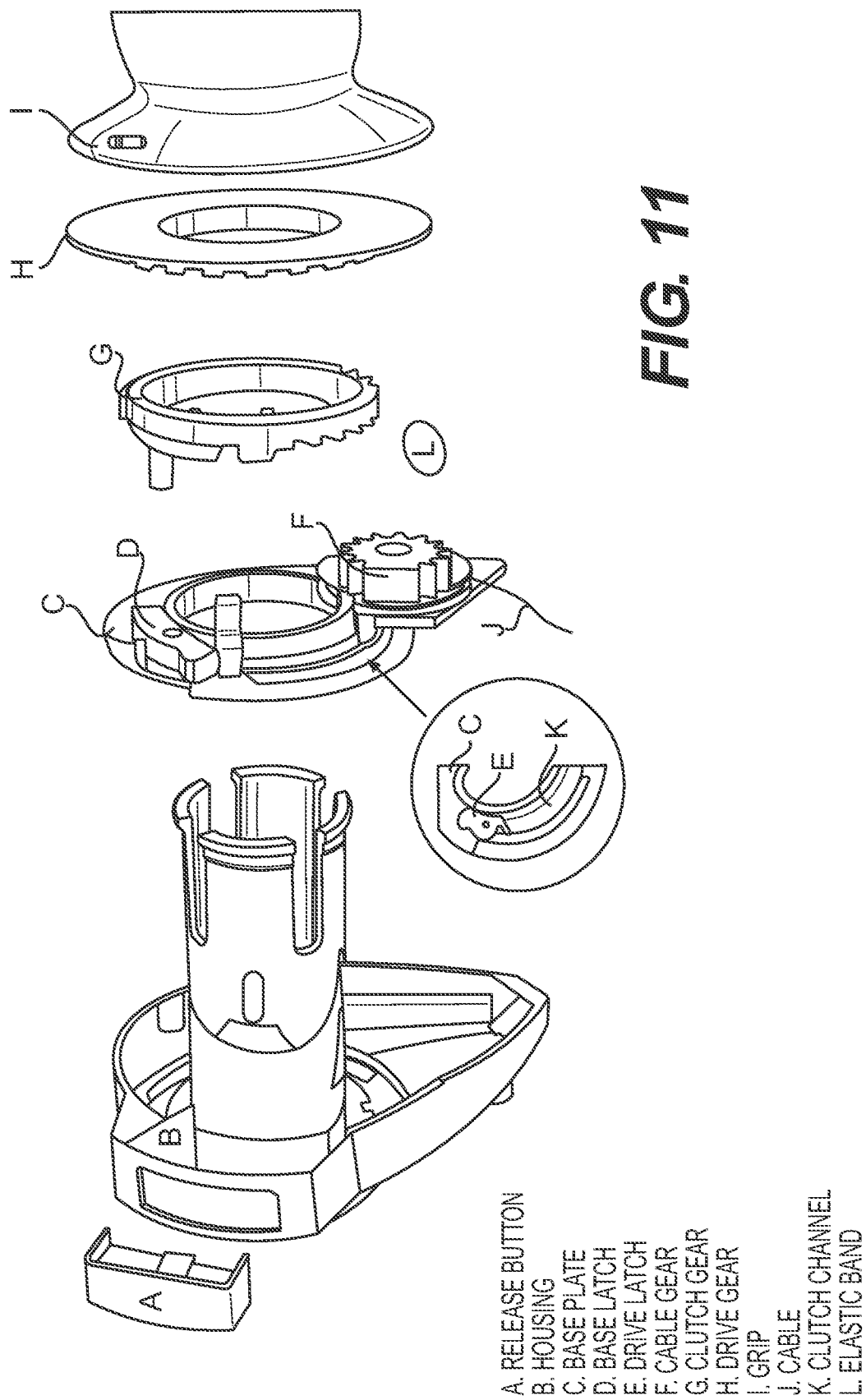
FIG. 11 is an alternative diagrammatic view of the lift activation assembly according to one or more implementations of the present disclosure.
Figure 12:
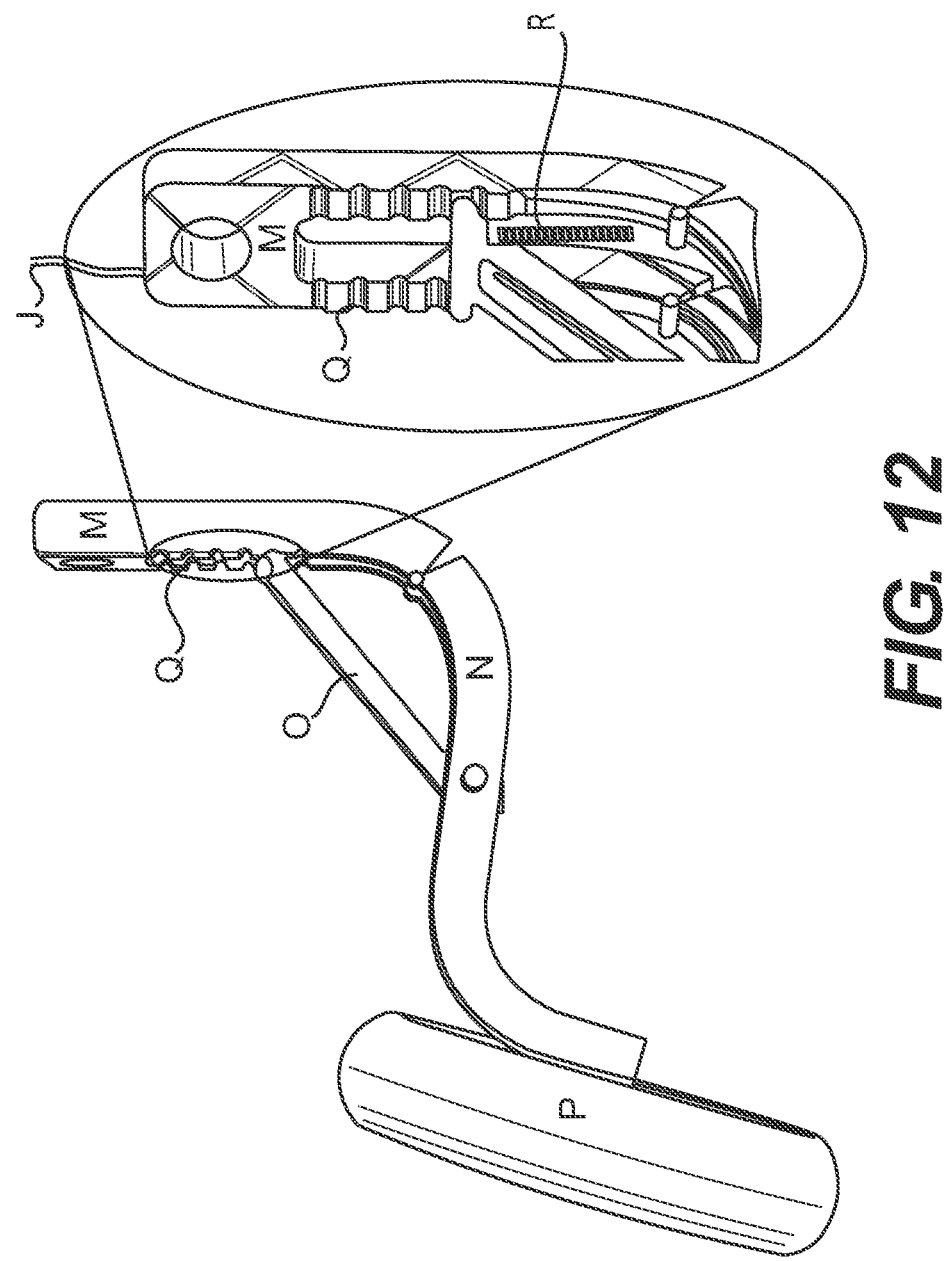
FIG. 12 is a diagrammatic view of the training wheel assembly according to one or more implementations of the present disclosure.

As noted above, and referring also at least to FIGS. 10-12, lift activation assembly 12 for training wheel assembly 10 may include handlebar grip 26, and training wheel assembly 10 may further include a wheel mount assembly (e.g., wheel mount assembly 14). In some implementations, as shown in FIG. 11, handlebar grip 26 may include a release button (e.g., release button (A)), a housing (e.g., housing (B)), a base plate (e.g., base plate (C)), a base latch (e.g., base latch (D)), a drive latch (e.g., drive latch (E)), a cable gear (e.g., cable gear (F)), a clutch gear (e.g., clutch gear (G)), a drive gear (e.g., drive gear (H)), a grip (e.g., grip (i)), a cable (e.g., cable (J)), a clutch channel (e.g., clutch channel (K)), and an elastic band (e.g., elastic band (L)). In some implementations, as shown in FIG. 12, wheel mount assembly 14 may include a stationary wheel mount arm (e.g., stationary arm (M) and/or pivot arm (N) and/or locking arm (O)), training wheel (e.g., wheel (P)), one or more teeth (e.g., teeth (Q)), and a spring (e.g., spring (R)).

In some implementations, drive gear (H) may be attached to handlebar grip (i), such that when handle grip (i) is rotated in a first direction (e.g., toward the front of the bicycle), drive gear (H) also may rotate. In some implementations, drive gear (H) may be locked to clutch gear (G) by drive latch (E). In some implementations, drive latch (E) may pivot in its mount on clutch gear (G) toward drive gear (H) until it engages with teeth on drive gear (H). In some implementations, drive latch (E) may be held in the engaged position by, e.g., elastic band (L). It will be appreciated that any type of band (or similar), or spring, may be used without departing from the scope of the present disclosure.

In some implementations, when grip (i) is rotated (e.g., toward the front of the bicycle), clutch gear (G) also may rotate, as it may be locked to drive gear (H) by drive latch (E). In the example, clutch gears (G) teeth may be engaged with teeth of cable gears (F), such that when clutch gear (G) rotates (e.g., clockwise), cable gear (F) may rotate counter-clockwise.

In some implementations, this may cause cable (J) to be pulled as it is wound around the recessed area on cable gear (F). Cable (J) may be attached to locking arm (O). When cable (J) is pulled, locking arm (O) may disengage from teeth (Q) and travel toward the top of stationary arm (M). Locking arm (O) may be attached to the pivot arm (N). As locking arm (O) is raised by cable (J), pivot arm (N) and wheel (P) may be raised. In some implementations, as long as there is tension on cable (J) and no upward force being applied to wheel (P), locking arm (O) may not engage any of teeth (Q), which may enable pivot arm (N) to raise wheel (P).

In some implementations, if the rider begins to fall while locking arm (O) is disengaged from teeth (Q), the bicycle may tilt from a vertical position toward a horizontal position as it falls. As this occurs, wheel (P) on the side of the fall may come into contact with the ground creating an upward force on wheel (P). The upward force may cause pivot arm (N) to move upward, which may cause locking arm (O) to engage whichever tooth (Q) it is closest to. In the example, this may stop pivot arm (N) from raising higher and may enable wheel (P) to provide the bicycle with support. In the example, this may provide the rider with a chance to regain his/her balance and continue riding or stop, straighten the bike, and try again. The upward force on wheel (P) may override any tension on cable (J) that may normally keep locking arm (O) in the disengaged position.

In some implementations, when handlebar grip (i) is rotated to the front/forward and/or back/backward of the bicycle (e.g., one quarter of a turn), training wheel (P) may be raised by cable (J) to a second position, which may be its highest position. In the example, training wheel (P) may be locked there by base latch (D), which may be mounted to clutch gear (G). In some implementations, it may engage a notch on base plate (C), which may prevent handlebar grip (i) from being rotated back toward its starting point. In the example, training wheel (P) may now be locked in the raised (second) position.

In some implementations, to lower training wheel (P), the rider may push release button (A), e.g., with his/her thumb. Release button (A) may then contact base latch (D) and drive latch (E), which may cause both to be rotated on their axis. Drive latch (E) may disengage clutch gear (G) from drive gear (H) by rotating out of its engagement with drive gear teeth (H). In the example, as drive latch (E) rotates out of its engagement with drive gear teeth (H), the pointed end of drive latch (E) may engage clutch channel (K) preventing elastic band (L) from returning drive latch (E) to the engaged position on drive gear (H). Base latch (D) may simultaneously disengage clutch gear (G) from base plate (C) by being rotated free of the notch on base plate (C).

In some implementations, clutch gear (G) may now be free from base plate (C) and from drive gear (H). Cable gear (F), which may be holding cable (J) in position, may be free to rotate as clutch gear (G) may now be disengaged and no longer able to restrict cable gear's (F) movement. This may enable training wheel (P) to be returned to the ground (e.g., the first position) by return spring (R) and/or gravity. As training wheel (P) returns to the ground, cable (J) may be pulled, which may rotate cable gear (F) and clutch gear (G) to their starting positions. In some implementations, when clutch gear (G) gets to its starting position, drive latch (E) may disengage with clutch channel (K), enabling elastic band (L) to rotate drive latch (E) and engage with drive gear teeth (H). In the example, lift activation assembly 12 may now be in a reset position and ready for another cycle.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations of implementations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A training wheel apparatus comprising:
   a lift activation assembly, wherein the lift activation assembly includes a grip, and wherein the grip is a handlebar twist grip;
   a wheel mount assembly configured to operatively connect to a wheel;
   a cable configured to operatively connect to the lift activation assembly and the wheel mount assembly via the handlebar twist grip, wherein the lift activation assembly, when activated by rotation of the handlebar twist grip in a first direction, is configured to use the cable to change an elevation of the wheel between a first position and a second position, and wherein the change of the elevation of the wheel is configured to occur while the wheel is in motion; and
   a release switch coupled to the handlebar twist grip that, when activated, changes the elevation of the wheel to the first position.

2. The training wheel apparatus of claim 1 wherein the handlebar twist grip, when rotated in a second direction, changes the elevation of the wheel to the first position.

3. The training wheel apparatus of claim 1 wherein the lift activation assembly further includes a drive gear, a clutch gear, and a drive latch.

4. The training wheel apparatus of claim 3 wherein the drive latch, when the handlebar twist grip is rotated in the first direction, pivots in a mount on the clutch gear and engages teeth on the drive gear.

5. The training wheel apparatus of claim 1 further comprising an electronic switch, wherein the electronic switch, when toggled, activates the lift activation assembly.

6. The training wheel apparatus of claim 1 further comprising a cable gear, wherein the cable, when the handlebar twist grip is rotated in the first direction, winds around a recessed area on the cable gear.

7. The training wheel apparatus of claim 4 wherein the lift activation assembly further includes a base latch operatively connected to the clutch gear, that when engaged with a notch on a base plate, prevents the handlebar twist grip from rotation in the second direction.

8. The training wheel apparatus of claim 4 wherein the drive latch, when the release switch is activated, disengages the clutch gear from the drive gear by rotating out of its engagement with one or more teeth of the drive gear.

9. The training wheel apparatus of claim 1 wherein the wheel mount assembly is further configured to operatively connect to a bicycle frame.

10. An apparatus comprising:
    a lift activation assembly configured to operatively connect to a handlebar of a bicycle frame, wherein the lift activation assembly includes a grip, and wherein the grip is a handlebar twist grip;
    a wheel mount assembly configured to operatively connect to a wheel and further configured to operatively connect to the bicycle frame;
    a cable configured to operatively connect to the lift activation assembly and the wheel mount assembly via the handlebar twist grip, wherein the lift activation assembly, when activated by rotation of the handlebar twist grip in a first direction, is configured to use the cable to change an elevation of the wheel between a first position and a second position; and
    a release switch coupled to the handlebar twist grip that, when activated, changes the elevation of the wheel to the first position.

11. The apparatus of claim 10 wherein the handlebar twist grip, when rotated in a second direction, changes the elevation of the wheel to the first position.

12. The apparatus of claim 10 wherein the lift activation assembly further includes a drive gear, a clutch gear, and a drive latch.

13. The apparatus of claim 12 wherein the drive latch, when the handlebar twist grip is rotated in the first direction, pivots in a mount on the clutch gear toward the drive gear.

14. The apparatus of claim 10 further comprising an electronic switch, wherein the electronic switch, when toggled, activates the lift activation assembly.

15. The apparatus of claim 10 further comprising a cable gear, wherein the cable, when the handlebar twist grip is rotated in the first direction, winds around a recessed area on the cable gear.

16. The apparatus of claim 13 wherein the lift activation assembly further includes a base latch operatively connected to the clutch gear, that when engaged with a notch on a base plate, prevents the handlebar twist grip from rotation in the second direction.

17. The apparatus of claim 13 wherein the drive latch, when the release switch is activated, disengages the clutch gear from the drive gear by rotating out of its engagement with one or more teeth of the drive gear.

18. The apparatus of claim 10 wherein the change of the elevation of the wheel is configured to occur while the wheel is in motion.

19. The apparatus of claim 10 wherein the wheel includes a training wheel.

20. An apparatus comprising:
    a lift activation assembly configured to operatively connect to a handlebar of a bicycle frame, wherein the lift activation assembly includes a switch and a release switch, wherein the lift activation assembly further includes a cable gear;
    a wheel mount assembly configured to operatively connect to a wheel and further configured to operatively connect to the bicycle frame; and
    a cable configured to operatively connect to the lift activation assembly and the wheel mount assembly, wherein the lift activation assembly, when activated by the switch, is configured to use the cable to change an elevation of the wheel between a first position and a second position, by winding around a recessed area on the cable gear, and wherein the lift activation assembly, when activated by the release switch, is configured to use the cable to change the elevation of the wheel to the first position.

21. The apparatus of claim 20 wherein the switch is an electronic switch.

* * * * *